United States Patent
Kreye et al.

(10) Patent No.: US 8,714,625 B2
(45) Date of Patent: May 6, 2014

(54) PROFILED DECORATIVE MOLDING, IN PARTICULAR FOR THE WINDOW AREA OF A MOTOR VEHICLE

(75) Inventors: Bernhard Kreye, Wunstorf (DE); Joerg Spielmann, Sundern (DE)

(73) Assignee: HENNIGES Automotive GmbH & Co. KG, Rehburg-Loccum (DE)

( * ) Notice: Subject to any disclaimer, the term of this patent is extended or adjusted under 35 U.S.C. 154(b) by 82 days.

(21) Appl. No.: 12/737,056

(22) PCT Filed: May 15, 2009

(86) PCT No.: PCT/DE2009/000694
§ 371 (c)(1),
(2), (4) Date: Dec. 6, 2010

(87) PCT Pub. No.: WO2009/146672
PCT Pub. Date: Dec. 10, 2009

(65) Prior Publication Data
US 2011/0121594 A1 May 26, 2011

(30) Foreign Application Priority Data
Jun. 5, 2008 (DE) .......... 10 2008 026 922

(51) Int. Cl.
*B60J 10/02* (2006.01)
*B60J 1/18* (2006.01)

(52) U.S. Cl.
USPC .......... 296/146.16; 296/93; 296/1.08

(58) Field of Classification Search
USPC .......... 296/1.08, 146.1, 146.14, 146.16, 93
See application file for complete search history.

(56) References Cited

U.S. PATENT DOCUMENTS

| 5,133,537 A * | 7/1992 | Shirahata et al. | 296/93 |
| 6,174,477 B1 | 1/2001 | Nagahashi et al. | |
| 6,722,731 B2 * | 4/2004 | Cornils et al. | 296/201 |
| 2005/0084629 A1 | 4/2005 | Gopalan | |

FOREIGN PATENT DOCUMENTS

EP 0 881 113 12/1998

OTHER PUBLICATIONS

International Search Report.
European Examination Report dated Mar. 29, 2012 in European Application No. 09 757 106.1, with English translation of relevant portions of same.

* cited by examiner

*Primary Examiner* — Glenn Dayoan
*Assistant Examiner* — Melissa A Black
(74) *Attorney, Agent, or Firm* — Collard & Roe, P.C.

(57) ABSTRACT

The invention relates to a profiled decorative molding for the window area of a motor vehicle, comprising a profiled part which is shaped preferably from plastic as a support for at least one decorative element. According to the invention, each decorative element is back-molded with the plastic provided for the profiled element such that at least an area of the profiled part, which is not covered by the decorative element, protrudes the lateral edge thereof. The protruding area of the profiled part is designed as an elastically deformable lip. Each decorative element is a blank from a film and each elastically deformable lip is designed as an injection of the profiled part which, as a result, comprises a hard and a soft material component. The back-molded profiled part is fixed to a dedicated location of the window area by means of connecting auxiliary means, such as for example adhesives or latch elements.

3 Claims, 2 Drawing Sheets

Figure 1:
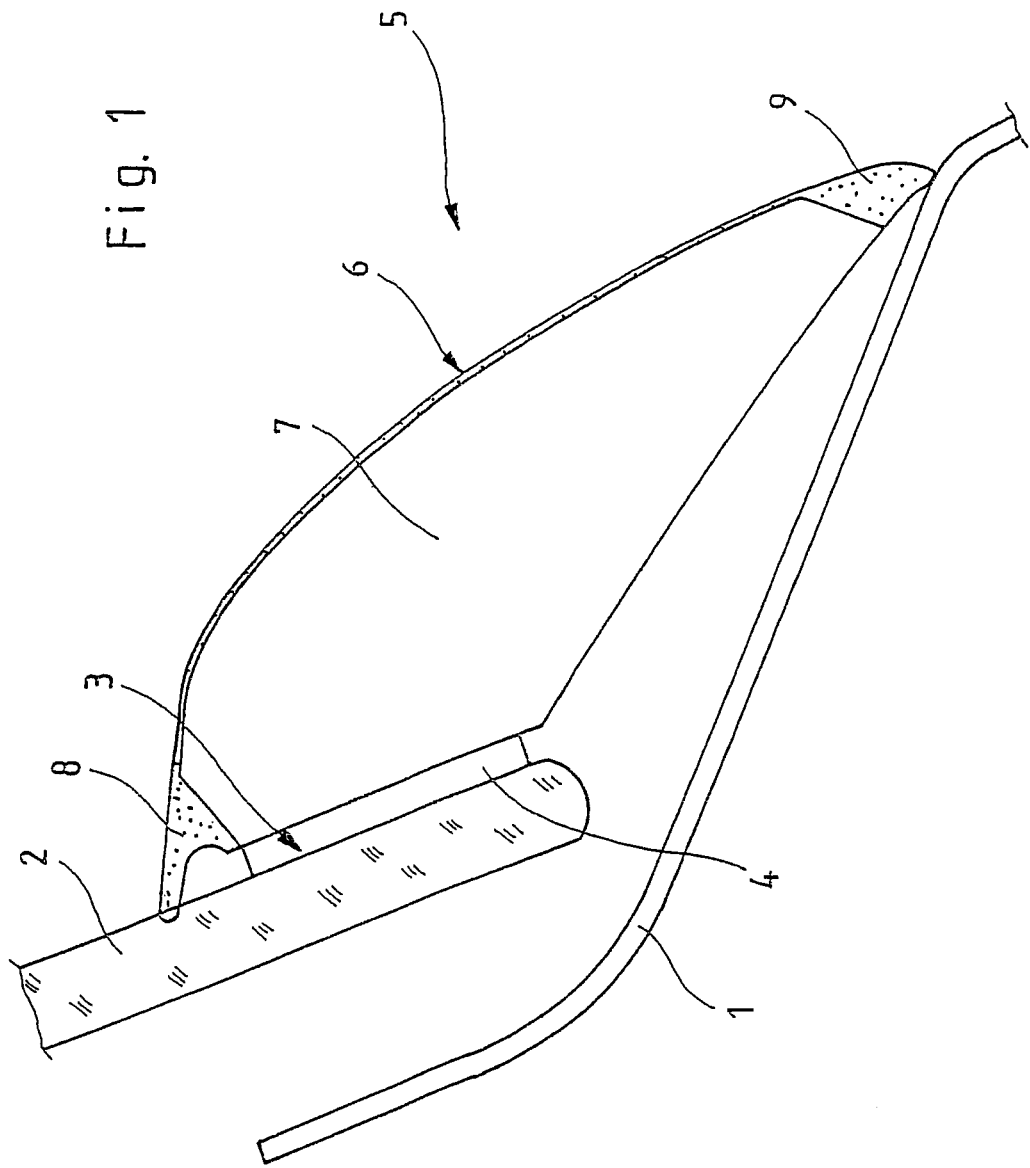

PROFILED DECORATIVE MOLDING, IN PARTICULAR FOR THE WINDOW AREA OF A MOTOR VEHICLE

CROSS REFERENCE TO RELATED APPLICATIONS

This application is the National Stage of PCT/DE2009/000694 filed on May 15, 2009, which claims priority under 35 U.S.C. §119 of German Application No. 10 2008 026 922.0 filed on Jun. 5, 2008, the disclosure of which is incorporated by reference. The international application under PCT article 21(2) was not published in English.

The invention relates to a profiled decorative moulding, in particular for the window area of a motor vehicle, comprising a profiled part which is shaped preferably from plastic as a support for at least one decorative element.

Profiled decorative mouldings, in particular profiled decorative mouldings for the window area of a motor vehicle, usually consist of metal, e.g. of aluminium or of steel. Profiled decorative mouldings have the corresponding decorative elements on their visible surface. These can, for example, be polished or chrome-plated surface areas of the profiled decorative mouldings themselves or pre-fabricated metal parts having a suitably configured visible surface with which a profiled part formed, for example, from plastic is equipped.

Every profiled decorative moulding is therefore either a structural unit composed of a decorative element and profiled part or a one-piece, pre-fabricated component, for example, a decorative strip. The profiled decorative moulding present either as a pre-fabricated component or as a structural unit likewise composed of pre-fabricated elements can be mounted or fastened in the window area at the location intended for it.

A profiled decorative moulding made of metal requires appreciable expenditure with regard to its manufacture and also with regard to its fastening in the window area of a motor vehicle.

The disadvantage of an increased expenditure is also obtained in the case of decorative elements made of metal which are connected to a profiled part to form a structural unit forming a profiled decorative moulding, where the mounting of the decorative element present, for example, as a decorative strip made of metal, on a profiled part which consists, for example, of plastic should be considered to be an additional cost factor.

It is the object of the invention to achieve cost savings in the field of using profiled decorative mouldings in the window area of a motor vehicle without needing to accept disadvantageous impairments of the visual appearance of a profiled decorative moulding or a decorative strip.

This object is achieved according to the invention.

Further developments and advantageous embodiments are discussed below.

The profiled decorative moulding is formed by back-moulding the decorative element or decorative elements. The profiled decorative moulding is therefore a profiled part injection-moulded from plastic having at least one of the decorative elements arranged on its visible surface.

During the formation of the profiled part by back-moulding of the decorative element, the respective profiled decorative moulding is thus formed or the respective profiled decorative moulding will be formed by the back-moulding of the decorative element.

Any pre-fabrication of a profiled part which involves joining together with a decorative element in order to form the profiled decorative moulding is therefore omitted so that a cost factor dependent on this is not given.

According to the invention, only one pre-fabricated decorative element is inserted in an injection mould of an injection moulding system or an injection moulding machine and is back-moulded with plastic. After opening the injection mould, the moulded profiled decorative moulding or the moulded decorative strip can be removed and supplied for further use, e.g. mounting in the window area of a motor vehicle.

A considerable reduction of the manufacturing costs for the profiled decorative moulding is furthermore obtained particularly by the fact that each decorative element is a blank made of a film. Films having metal coating give the visual appearance of a metal visible surface, wherein a film thickness of, for example, 0.1 to 0.4 mm during the production of a profiled decorative moulding is considerably more favourable than the processing of a decorative strip made of metal sheet having a 1 mm metal thickness, for example.

Such thin decorative elements can advantageously readily replace usual decorative elements made of metal or metal sheet. According to the invention, the suitably cut film sections are back-moulded with thermoplastic material, e.g. PC, PP, PA, PMMA, ABS etc, whereby the profiled decorative moulding is then present in pre-fabricated form ready for mounting.

If profiled decorative mouldings are mounted in the window area, compensation is frequently required in regard to the distance between the surface in the window area on which the profiled decorative moulding is mounted and the side of the profiled decorative moulding facing this surface.

It is usual to provide special compensating lips for such compensating measures which consist of material which is elastically deformable and therefore can easily nestle against the respective surface.

A lip can also be configured to be elastically deformable in that it is particularly thin and therefore easily bendable.

In the profiled decorative moulding according to the invention, the elastically deformable lip serving as a compensating element is formed during the back-moulding of the decorative element or in a subsequent processing stage, i.e. the formation of the profiled part and the elastic compensating element takes place in the operation of back-moulding the film serving as a decorative element, either simultaneously or slightly offset in time.

Naturally, it is also possible to injection mould the elastically deformable lip in a separate operation subsequently onto the profiled part which has already been produced by back-moulding the film.

It is particularly advantageous, however, to use a so-called two-component injection moulding method where the film is back-moulded with the plastic component for the profiled part in a first step and then in a second step a soft plastic component is injection-moulded onto the back-moulding for the elastically deformable lips, the compensating lips. PVC, TPE, rubber or PU can be considered for this.

The back-moulding of the film with plastics, which have different hardness, can thus take place in two stages but, as already mentioned, can also readily be executed at the same time by means of so-called multiple injection moulding systems.

The profiled decorative moulding formed as described previously by back-moulding the decorative element can advantageously be fastened by means of connecting auxiliary means at a location of the window area provided for this purpose. The profiled decorative moulding according to the invention could be fastened on the glass of a window pane, for example, by means of a direct adhesive bonding if the auxiliary connecting means comprises an adhesive.

It is naturally also possible to equip the profiled part formed according to the invention with positive locking elements which have been formed simultaneously during its forming which takes place by back-moulding the decorative element. These can be locked or clipped to suitable form elements of a pre-fabricated intermediate holder, for example, an extruded holder profile.

The intermediate holder or the intermediate holding profile can in turn be fastened to the predetermined location in the window area by means of an adhesive.

Naturally all the usual known fastening techniques can be used as connecting auxiliary means. It is particularly advantageous to utilise or use the profiled decorative moulding according to the invention in conjunction with a box strip of a vehicle window.

Box strips are usually profiles produced in the extrusion process with an inserted core strip made of metal.

The invention now makes it possible to fit such box strips with profiled decorative mouldings in a particularly cost-effective manner by fastening a profiled decorative moulding according to the invention on the box strip with adhesive. Instead of a paste-like application of adhesive, adhesive bonding using double-sided adhesive tape is also readily possible.

Figure 2:
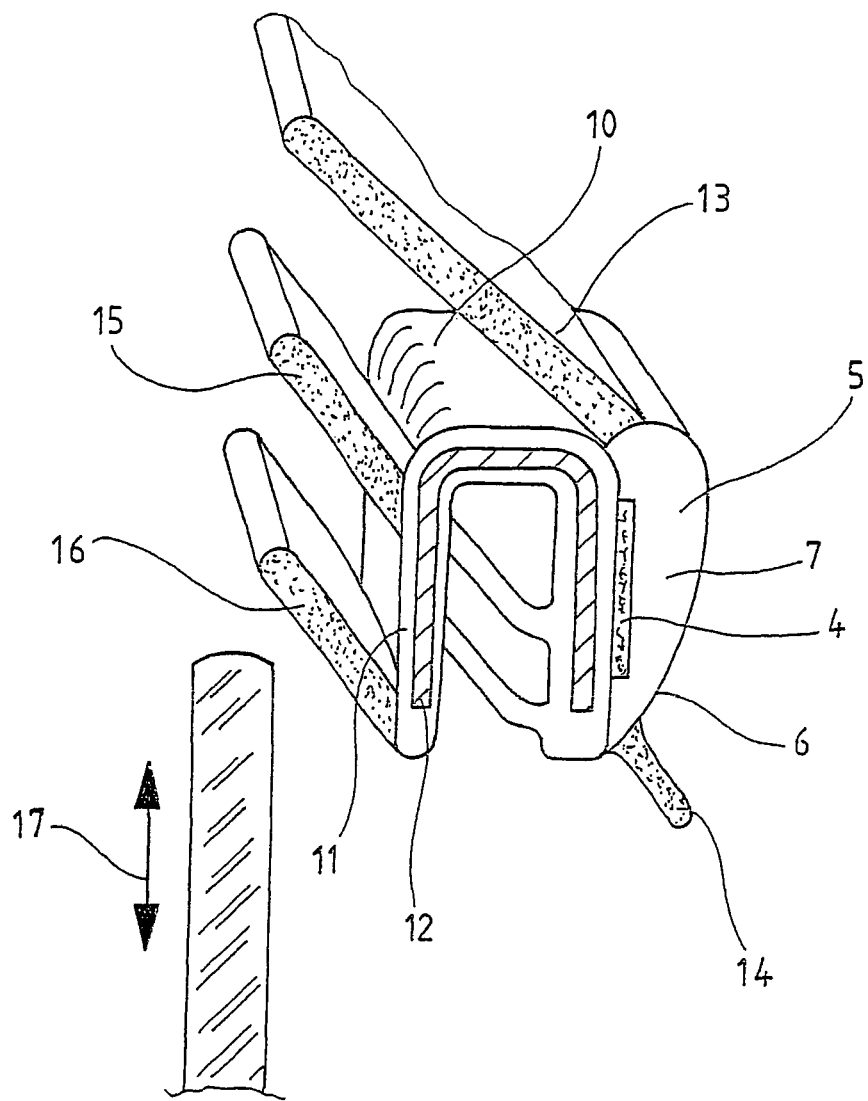

An exemplary embodiment of the invention from which further inventive features are obtained, is depicted in the drawings. In the figures:

FIG. 1: shows a side view of a window area of a motor vehicle in cross-section, with a profiled decorative moulding according to a first embodiment fastened on the glass pane of the window FIG. 2: shows a side view of a box strip of a window area in cross-section, wherein a profiled decorative moulding according to a second embodiment is fastened on the box strip.

FIG. 1 shows a side view of a window area of a motor vehicle schematically in cross-section. The bodywork flange in the bodywork forming one window edge is designated by 1. A window pane 2 made of glass is inserted in the window opening bordered or delimited by the bodywork flange 1. A profiled decorative moulding 5 is fastened to the window pane 2 by means of connecting auxiliary means 3, which in this exemplary embodiment is an adhesive 4. The profiled decorative moulding 5 consists of a decorative element 6 having a profiled part 7 back-moulded from plastic. The profiled part 7 of the profiled decorative moulding 5 is formed by back moulding the decorative element 6 with a plastic. Elastically deformable lips 8 and 9 are arranged on the two lateral edges of the profiled part 7 of the profiled decorative moulding 5 as compensating lips to compensate for the distance from the window pane 2 and from the bodywork flange 1. Any elastically deformable lip 8 or 9 is also formed as an injection moulding on the profiled part 7.

FIG. 2 shows an embodiment of a window area of a motor vehicle which is fitted with a box strip 11 in cross-section. The box strip is an extruded profile with an insert 12 made of metal.

A profiled decorative moulding 5 is fastened with adhesive 4 to the box strip 10 on the outside, the profiled part 7 of the profiled decorative moulding 5 being present here as a back-moulding of the decorative element 6. Elastically deformable lips, likewise configured as a moulding, are again designated by 13 and 14 as well as 15 and 16. The elastically deformable lips 13, 15 and 16 can optionally abut or nestle sealingly against the window pane 2 which can be moved in the direction of the double arrow 17.

The particular feature of the profiled decorative moulding 5 according to FIG. 1 and FIG. 2 is that each decorative element is a prepared blank made of a film which can be relatively thin.

The invention claimed is:

1. A combination comprising:
a window;
a profiled decorative molding; and
an auxiliary connector fastening the profiled decorative molding to the window;
wherein the profiled decorative molding comprises:
at least one decorative element comprising a lateral edge; and
a profiled part shaped from plastic to form a support for the at least one decorative element;
wherein the at least one decorative element is back-molded with the plastic provided for the profiled part so that an area of the profiled part is not covered by the at least one decorative element and protrudes over the lateral edge to form at least one elastically deformable lip;
wherein the auxiliary connector fastens the profiled part of the profiled decorative molding to the window; and
wherein the auxiliary connector comprises:
a pre-fabricated intermediate holder,
mutually latchable positive locking elements arranged on the profiled part and on the pre-fabricated intermediate holder, and
adhesive on the intermediate holder, the adhesive fastening the intermediate holder to the window.

2. The combination according to claim 1, wherein the window comprises a box strip, and
wherein the auxiliary connector fastens the profiled part to the box strip.

3. The combination according to claim 1, wherein the window comprises a window pane made of glass and having a surface, and
wherein the auxiliary connector fastens the profiled part to the surface of the window pane.

* * * * *